US010329979B2

(12) United States Patent
Srinivasan et al.

(10) Patent No.: US 10,329,979 B2
(45) Date of Patent: Jun. 25, 2019

(54) ENGINE CONTROLLER AND METHODS FOR CONTROLLING EMISSION AND POWER GENERATION SYSTEM USING THE SAME

(71) Applicant: AI ALPINE US BIDCO INC, Schenectady, NY (US)

(72) Inventors: Prashant Srinivasan, Bangalore (IN); Maruthi NarasingaRao Devarakonda, Waukesha, WI (US); William Collins Vining, Schenectady, NY (US); Edward Owen Reinbold, Hayward, WI (US); Dipankar Deb, Ahmedabad (IN)

(73) Assignee: AI ALPINE US BIDCO INC, Wilmington, DE (US)

( * ) Notice: Subject to any disclaimer, the term of this patent is extended or adjusted under 35 U.S.C. 154(b) by 269 days.

(21) Appl. No.: 15/265,865

(22) Filed: Sep. 15, 2016

(65) Prior Publication Data
US 2017/0074138 A1    Mar. 16, 2017

(30) Foreign Application Priority Data
Sep. 15, 2015    (IN) ........................... 4899/CHE/2015

(51) Int. Cl.
*F01N 3/10*    (2006.01)
*F01N 3/20*    (2006.01)
(Continued)

(52) U.S. Cl.
CPC ............. *F01N 3/101* (2013.01); *F01N 9/005* (2013.01); *F02D 41/1401* (2013.01);
(Continued)

(58) Field of Classification Search
CPC ...... F01N 3/101; F01N 9/005; F01N 2430/06; F01N 2430/08; F01N 2560/026;
(Continued)

(56) References Cited

U.S. PATENT DOCUMENTS 6,474,323 B1    11/2002    Beck et al.
6,484,703 B1    11/2002    Bailey
(Continued)

FOREIGN PATENT DOCUMENTS

JP    58211549 A    12/1983

OTHER PUBLICATIONS

Einewall et al., "Lean Burn Natural Gas Operation vs. Stoichiometric Operation with EGR and a Three Way Catalyst", SAE Technical Paper 2005-01-0250, 2005.
(Continued)

*Primary Examiner* — Brandon D Lee
(74) *Attorney, Agent, or Firm* — Fletcher Yoder, P.C.

(57) ABSTRACT

A method for controlling an emission amount in an exhaust gas stream emitted from a power generation system is presented. The method includes determining a pre-catalyst emission level using a combustion engine model. The method further includes determining a post-catalyst emission level using a three-way catalyst model based on the pre-catalyst emission level. Furthermore, the method includes determining an adjusted post-catalyst emission level based on the post-catalyst emission level. Moreover, the method includes determining a difference between the post-catalyst emission level and the adjusted post-catalyst emission level and comparing the difference with a threshold value. Additionally, the method includes determining whether to adjust an actual value of an engine operating parameter based on the comparison such that the emission amount in the exhaust gas stream is maintained below an emission regulatory limit. An engine controller and a power generation system employing the method are also presented.

19 Claims, 5 Drawing Sheets

(51) Int. Cl.
*F02D 41/26* (2006.01)
*F02D 41/14* (2006.01)
*F01N 9/00* (2006.01)
*F02D 41/00* (2006.01)
*F02D 35/02* (2006.01)

(52) U.S. Cl.
CPC ...... *F02D 41/1444* (2013.01); *F01N 2430/06* (2013.01); *F01N 2430/08* (2013.01); *F01N 2560/026* (2013.01); *F01N 2560/028* (2013.01); *F01N 2560/06* (2013.01); *F01N 2560/07* (2013.01); *F01N 2900/1402* (2013.01); *F02D 35/027* (2013.01); *F02D 41/0072* (2013.01); *F02D 41/1445* (2013.01); *F02D 41/1446* (2013.01); *F02D 41/1463* (2013.01); *F02D 2041/1433* (2013.01); *F02D 2041/1472* (2013.01); *F02D 2200/1015* (2013.01); *F02D 2200/701* (2013.01)

(58) Field of Classification Search
CPC ........... F01N 2560/028; F01N 2560/06; F01N 2560/07; F01N 2900/1402; F02D 41/1401; F02D 41/1444; F02D 2041/1433; F02D 2041/1472; F02D 2200/1015; F02D 2200/701; F02D 35/027; F02D 41/0072; F02D 41/1445; F02D 41/1446; F02D 41/1463; Y02T 10/22; Y02T 10/47
See application file for complete search history.

(56) References Cited

U.S. PATENT DOCUMENTS

| | | |
|---|---|---|
| 7,231,906 B1 | 6/2007 | Haskara et al. |
| 7,958,866 B2 | 6/2011 | Thomas |
| 8,733,081 B2 | 5/2014 | Miyashita |
| 2003/0093993 A1* | 5/2003 | Lutz ............... F01N 11/007 60/285 |
| 2006/0075740 A1 | 4/2006 | Twigg et al. |
| 2010/0292811 A1 | 11/2010 | Schwarte |
| 2016/0312720 A1* | 10/2016 | Fukui ..................... F01N 3/08 |

OTHER PUBLICATIONS

Hongwei et al., "A study of air-fuel ratio and EGR control system for LPG engines", Intelligent Control and Automation, 2002. Proceedings of the 4th World Congress on, IEEE Xplore, vol. 2, pp. 1376-1379, 2002.

* cited by examiner

ENGINE CONTROLLER AND METHODS FOR CONTROLLING EMISSION AND POWER GENERATION SYSTEM USING THE SAME

BACKGROUND

Embodiments of the invention relate to a system and a method for improving engines operating at a stoichiometric condition. More particularly, embodiments of the invention relate to an engine controller and related methods for controlling an emission amount in a gas stream emitted from a power generation system employing an engine operating at the stoichiometric condition.

Internal combustion (IC) engines are used in a wide range of applications. The IC engines use a variety of fuels including, but not limited to, liquid fuels such as gasoline (sometimes referred to as petrol) and diesel, and gaseous fuels such as liquefied natural gas (LNG) or liquefied petroleum gas (LPG). Typically, combustion of such fuels in an IC engine produces by-products that are discharged from the IC engine in the form of a gas stream. The exhaust gas stream from the IC engine may include contaminants, such as, oxides of nitrogen (NOx), carbon monoxide (CO), hydrocarbons (HC), or combinations thereof. Such contaminants, when mixed into the atmosphere, may lead to various environmental hazards.

Typically, in order to minimize levels of the contaminants (sometimes referred to as emission levels) in the gas stream, the IC engines operating at stoichiometric condition may employ a three-way catalyst. The three-way catalyst causes chemical reactions such as, but not limited to, oxidation and reduction, to treat the gas stream in order to minimize the levels of the contaminants. Further, use of an exhaust gas recirculation (EGR) along with the use of the three-way catalyst may help in minimizing levels of the contaminants.

However, in order to consistently achieve low levels of the contaminants in the exhaust gas stream, it may be desirable to maintain operation of the IC engine at the stoichiometric condition. Maintaining the stoichiometric condition during the operation of the IC engine may be a challenge. Further, maintaining low levels of the contaminants as the IC engine and the three-way catalyst ages, may be another challenge. Furthermore, when the IC engine is employed in a mobile application, it may also be desirable that the levels of the contaminants are maintained to meet emission requirements of a given region. Thus, there is a need for improved methods and related controllers and power generation systems to maintain the emission levels in the exhaust stream.

BRIEF DESCRIPTION

One embodiment of the invention is directed to a method for controlling an emission amount in a gas stream emitted from a power generation system including a combustion engine operating at stoichiometric conditions, and a three-way catalyst disposed downstream of the combustion engine. The method includes determining a pre-catalyst emission level using a combustion engine model. The method further includes determining a post-catalyst emission level using a three-way catalyst model based on the pre-catalyst emission level. Furthermore, the method includes determining an adjusted post-catalyst emission level based on the post-catalyst emission level. Moreover, the method also includes determining a difference between the post-catalyst emission level and the adjusted post-catalyst emission level and comparing the difference with a threshold value. Additionally, the method includes determining whether to adjust an actual value of an engine operating parameter based on the comparison such that the emission amount in the gas stream is maintained below an emission regulatory limit.

Another embodiment of the invention is directed to an engine controller for controlling an emission amount in a gas stream emitted from a power generation system including a combustion engine operating at stoichiometric conditions, and a three-way catalyst disposed downstream of the combustion engine. The engine controller includes a memory storing one or more processor-executable routines. The engine controller further includes one or more processors to execute the one or more processor-executable routines which, when executed, cause acts to be performed including determining a pre-catalyst emission level using a combustion engine model. The acts to be performed also include determining a post-catalyst emission level using a three-way catalyst model based on the pre-catalyst emission level. Further, the acts to be performed include determining an adjusted post-catalyst emission level based on the post-catalyst emission level. Furthermore, the acts to be performed include determining a difference between the post-catalyst emission level and the adjusted post-catalyst emission level and comparing the difference with a threshold value. Moreover, the acts to be performed also include determining whether to adjust an actual value of an engine operating parameter based on the comparison such that the emission amount in the gas stream is maintained below an emission regulatory limit.

Yet another embodiment of the invention is directed to a power generation system. The power generation system includes a combustion engine operating at stoichiometric conditions. The power generation system further includes a three-way catalyst disposed downstream of the combustion engine. Furthermore, the power generation system includes an engine controller operably coupled to the combustion engine to control an emission amount in a gas stream emitted from the power generation system. The engine controller includes a memory storing one or more processor-executable routines. The engine controller further includes one or more processors to execute the one or more processor-executable routines which, when executed, cause acts to be performed including determining a pre-catalyst emission level using a combustion engine model. The acts to be performed also include determining a post-catalyst emission level using a three-way catalyst model based on the pre-catalyst emission level. Further, the acts to be performed include determining an adjusted post-catalyst emission level based on the post-catalyst emission level. Furthermore, the acts to be performed include determining a difference between the post-catalyst emission level and the adjusted post-catalyst emission level and comparing the difference with a threshold value. Moreover, the acts to be performed also include determining whether to adjust an actual value of an engine operating parameter based on the comparison such that the emission amount in the gas stream is maintained below an emission regulatory limit.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

Figure 1:
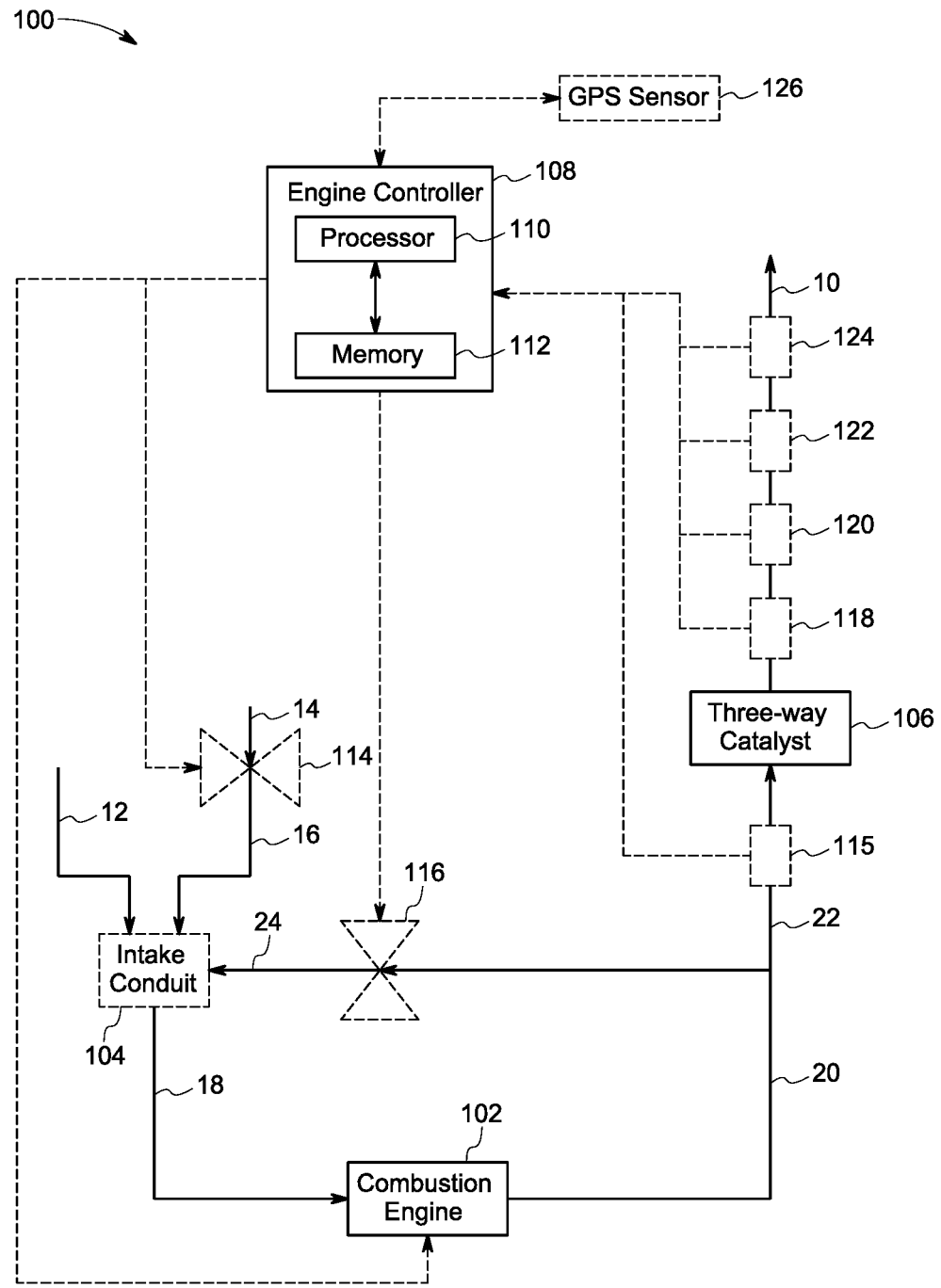
FIG. 1 is a diagrammatical illustration of a power generation system, in accordance with one embodiment of the invention.

The specification may be best understood with reference to the detailed figures and description set forth herein. Various embodiments of the invention are described hereinafter with reference to the figures. However, those skilled in the art will readily appreciate that the detailed description given herein with respect to these figures is for explanatory purposes as the method and the system may extend beyond the described embodiments of the invention.

Unless defined otherwise, technical and scientific terms used herein have the same meaning as is commonly understood by one of ordinary skill in the art to which this disclosure belongs. In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. Here and throughout the specification and claims, range limitations may be combined and/or interchanged; such ranges are identified and include all the sub-ranges contained therein unless context or language indicates otherwise.

Some embodiments of the invention are directed to a power generation system and a method of controlling an emission amount in a gas stream emitted from the power generation system. The power generation system includes a combustion engine operating at stoichiometric conditions. The power generation system further includes a three-way catalyst disposed downstream of the combustion engine. Furthermore, the power generation system includes an engine controller operably coupled to the combustion engine to control an emission amount in a gas stream emitted from the power generation system. The engine controller includes a memory storing one or more processor-executable routines. The engine controller further includes one or more processors to execute the one or more processor-executable routines which, when executed, cause acts to be performed including determining a pre-catalyst emission level using a combustion engine model. The acts to be performed also include determining a post-catalyst emission level using a three-way catalyst model based on the pre-catalyst emission level. Further, the acts to be performed include determining an adjusted post-catalyst emission level based on the post-catalyst emission level. Furthermore, the acts to be performed include determining a difference between the post-catalyst emission level and the adjusted post-catalyst emission level and comparing the difference with a threshold value. Moreover, the acts to be performed also include determining whether to adjust an actual value of an engine operating parameter based on the comparison such that the emission amount in the gas stream is maintained below an emission regulatory limit.

FIG. 1 is a diagrammatical illustration of a power generation system 100, in accordance with one embodiment of the invention. As illustrated in FIG. 1, in some embodiments of the invention, the power generation system 100 may include a combustion engine 102, a three-way catalyst 106 disposed downstream of the combustion engine 102, and an engine controller 108. The engine controller 108 may be operably coupled to the combustion engine 102 to control an emission amount in a gas stream 10 emitted from the power generation system 100.

In some embodiments of the invention, the power generation system 100 may further include an intake conduit 104 that may receive an air stream 12 and a fuel stream 16. The intake conduit 104 may be configured to facilitate mixing of the air stream 12 with the fuel stream 16 thereby generating a mixed stream 18, which may be received by the combustion engine 102.

The combustion engine 102 may be an internal combustion (IC) engine. In a non-limiting example, the combustion engine 102 may be a gas engine. In some embodiments of the invention, the combustion engine 102 may include one or more cylinders (not shown). Each cylinder of the one or more cylinders may include a combustion chamber, a piston, and a crankshaft mechanically coupled to the piston. Further, the combustion engine 102 may also include one or more fuel injectors (not shown) to inject the one or more fuels directly into the combustion chamber or via an intake manifold (not shown) to the combustion chamber.

In some embodiments of the invention, the combustion engine 102 may be fluidly coupled to the intake conduit 104 to receive the mixed stream 18. The engine controller 108 may, at least in part, control the combustion of the mixed stream 18 in the combustion engine 102 by way of controlling injection of the mixed stream 18 into the combustion engine 102. The injection of the mixed stream 18 into the combustion engine 102 may be controlled by the engine controller 104 by controlling one or more of an intake valve (not shown) or the one or more fuel injectors. In certain embodiments of the invention, the combustion engine 102 may be operated at a stoichiometric condition. The term "stoichiometric condition" as used herein refers to an operation of the combustion engine 102 at an air-fuel equivalence ratio (hereinafter, alternatively referred to as a lambda set-point a ($\lambda_{set-point}$)) of one (1) or substantially close to one (1). In one embodiment of the invention, the $\lambda$ set-point may be represented by a following equation:

$$\lambda_{set\text{-}point} = \frac{AFR_{actual}}{AFR_{stoichiometric}} \quad (1)$$

where, $AFR_{actual}$ represents an actual air-fuel ratio of the mixed stream 18 and $AFR_{stoichiometric}$ represents a stoichiometric air-fuel ratio of the mixed stream 18 for a given fuel. A value of $\lambda_{set\text{-}point}$ greater than 1 may be indicative of the mixed stream 18 having a lean air-fuel mixture and the value of $\lambda_{set\text{-}point}$ lower than 1 may be indicative of the mixed stream 18 having a rich air-fuel mixture.

In response to the combustion at the stoichiometric condition, a reciprocating motion of the piston may be enabled. The piston may be mechanically coupled to the crankshaft such that a reciprocating motion of the piston is converted into a rotational motion of the crankshaft. Accordingly, in one embodiment of the invention, the power generation system 100 may generate a mechanical power in the form of the rotational motion of the crankshaft using a chemical energy of the one or more fuels. Combustion residues or by-products of the combustion may be discharged from the combustion engine 102 as an exhaust gas stream 20.

In some embodiments of the invention, the exhaust gas stream 20 may include contaminants such as oxides of nitrogen (NOx), carbon monoxide (CO), and hydrocarbons (HC). These contaminants, if emitted into the environment, may result in environmental hazards. In order to reduce levels of such contaminants a three-way catalyst 106 is disposed downstream of the combustion engine 102. In some embodiments of the invention, a flow path of the exhaust gas stream 20 may be designed such that at least a portion of the exhaust gas stream 20 may be directed toward the three-way catalyst 106. The portion of the exhaust gas stream 20 that is directed toward the three-way catalyst 106 is hereinafter referred to as a pre-catalyst gas stream 22.

The three-way catalyst 106 may facilitate a chemical reaction of at least a portion of the pre-catalyst exhaust gas stream 22, thereby forming the emitted gas stream 10 having reduced levels of such contaminants, for example, by converting at least a portion of the contaminants into nitrogen (N2), carbon dioxide (CO2) and water (H2O). By way of a non-limiting example, the three-way catalyst 106 may include a reduction catalyst and oxidation catalyst to aid in the chemical reaction with the pre-catalyst exhaust gas stream 22. In some embodiments of the invention, the reduction catalyst or the oxidation catalyst may have a ceramic honeycomb structure. Examples of materials used in the three-way catalyst 106 may include, but are not limited to, platinum (Pt), palladium (Pd), and rhodium (Rh).

In some embodiments of the invention, the power generation system 100 may employ an EGR system that facilitates a flow of a portion of an exhaust gas steam 20 back into the combustion engine 102. The EGR system may include an EGR valve 116 for controlling the flow of the portion of the exhaust gas stream 20 toward the combustion engine 102. The portion of the exhaust gas stream 20 that is directed toward the combustion engine 102 via the EGR valve 116 is hereinafter referred to as an EGR stream 24. In some embodiments of the invention, the engine controller 108 may control an open position or percentage opening of the EGR valve to control the flow of the EGR stream 24.

In certain embodiments of the invention, the EGR stream 24 may be supplied to the intake conduit 104, where it may be mixed with the air stream 12 and the fuel stream 16. In such an instance, when the EGR system is employed, the mixed stream 18 may be a mixture of the air stream 12, the fuel stream 16, and the EGR stream 24. Combustion of such mixed stream 18 in the combustion engine 102 may result in reduced flame temperature in the combustion engine 102. The reduction in the flame temperature may further reduce generation of the NOx in the exhaust gas stream 20. Also, a useful life of the combustion engine 102 may be improved due to the reduced temperature inside the combustion engine 102.

As noted earlier, the engine controller 108 may control an emission amount in the gas stream 10 emitted from a power generation system 100, in some embodiments. The engine controller 104 may include one or more processors, such as, a processor 110. The processor 110 may include a specially programmed general purpose computer, a microprocessor, a digital signal processor, and a microcontroller. Examples of the processor 110 may include, but are not limited to, a reduced instruction set computing (RISC) architecture type processor or a complex instruction set computing (CISC) architecture type processor. Further, the processor 110 may be a single-core processor or a multi-core processor. The processor 110 may also include, or, has electrically coupled thereto, one or more input/output ports.

The engine controller 104 may further include a memory 112 accessible by the processor 110. In one embodiment of the invention, the memory 112 may be integrated into the processor 110. In another embodiment of the invention, the memory 112 may be external to the processor 110 and electrically coupled to the processor 110, as depicted in FIG. 1. The memory 112 may be a non-transitory computer-readable media. The non-transitory computer-readable media may include tangible, computer-readable media, including, without limitation, non-transitory computer storage devices. The non-transitory computer storage devices may include, but are not limited to, volatile and non-volatile media, and removable and non-removable media such as a firmware, physical and virtual storage, a compact disc read only memory (CD-ROM), or a digital versatile disc (DVD). The non-transitory computer storage devices may also include digital source such as a network or the Internet, as well as yet to be developed digital means, with the sole exception being a transitory, propagating signal. Other non-limiting examples of the memory 112 include a dynamic random access memory (DRAM) device, a static random access memory (SRAM) device, and a flash memory.

The memory 112 may store processor-executable routines that are executable by the processor 110. The processor-executable routines, when executed by the processor 110, may cause acts to be performed that contribute to methods described below as well as other variants that are anticipated, but not specifically listed. In a non-limiting example, processor-executable routines may be implemented in a variety of programming languages, including but not limited to C, C++, or Java. In some embodiments of the invention, by executing one or more of the processor-executable routines, the processor 110 may aid in controlling the emission from the power generation system 100 such that the emission amount in the gas stream 10 is maintained below an emission regulatory limit.

Figure 2:
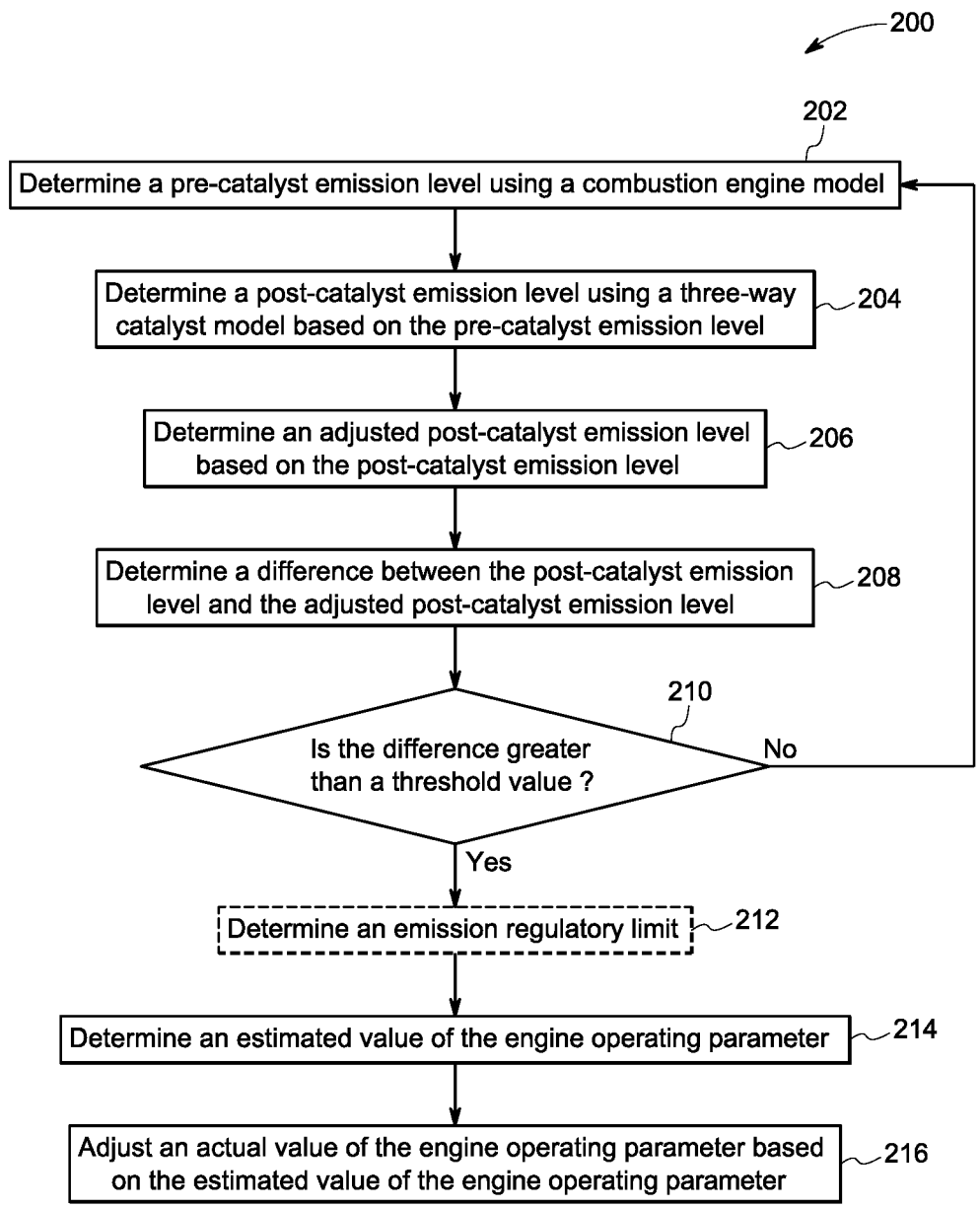
FIG. 2 depicts a flowchart illustrating a method for controlling an emission amount in a gas stream emitted from the power generation system of FIG. 1, in accordance with one embodiment of the invention.

In some embodiments of the invention, the processor-executable routines, when executed by the processor 110 may cause the acts to be performed. The acts to be performed may include steps illustrated in flowcharts of FIGS. 2 and 5. FIG. 2 depicts a flowchart illustrating a method 200 for controlling the emission amount in the gas stream 10 emitted from the power generation system 100, in accordance with one embodiment of the invention. As illustrated in FIG. 2, in some embodiments of the invention, the method 200 may include steps 202-216. The processor-executable routines, when executed by the processor 110, may cause the processor 110 to perform acts indicated by the steps 202-216 of the method 200.

Referring now to FIGS. 1 and 2, in some embodiments of the invention, the method 200 includes determining a pre-catalyst emission level using a combustion engine model at step 202. For example, the pre-catalyst emission level corresponding to one or more of the CO, NOx, and HC amount may be determined by the processor 110 using the combustion engine model.

In some embodiments of the invention, the combustion engine model may be representative of a relationship among one or more of an EGR set-point, an engine speed, an engine load, a brake mean effective pressure (BMEP), and a pre-catalyst emission level. In some embodiments of the invention, the EGR set-point may be the percentage opening or the open position of the EGR valve 116. The BMEP may be indicative of an intake manifold pressure of the cooled air-fuel-exhaust mixture. In a non-limiting example, the combustion engine model may be stored in the memory 112 and represented by following equations:

$$\text{Log}_{10}(CO) = ((X_1 * BMEP) - (X_2 * EGR_{setpoint}) + (X_3 * \lambda_{setpoint}) - (X_4 * \lambda_{setpoint}^2) - X_5) \quad (2)$$

$$\text{Log}_{10}(NOx) = ((X_6 * BMEP) - (X_7 * EGR_{setpoint}) + (X_8 * \lambda_{setpoint}) - (X_9 * EGR_{setpoint}^2) - X_{10}) \quad (3)$$

$$\text{Log}_{10}(HC) = (X_{11} - (X_{12} * BMEP) + (X_{13} * EGR_{setpoint}) - (X_{14} * \lambda_{setpoint}) - (X_{15} * EGR_{setpoint}^2))) \quad (4)$$

wherein, $X_1$-$X_{15}$ represents numeric coefficients, $EGR_{setpoint}$ represents an actual value of the EGR set-point, and $\lambda_{setpoint}$ represents an actual value of the $\lambda$ set-point. Although, not shown above, the combustion engine model may also be represented using equations that are based on a parameter, such as, but not limited to, the engine load, without limiting the scope of the present specification.

In another embodiment of the invention, the combustion engine model may be stored in the memory 112 as a combustion engine look-up table indicative of the relationship among the EGR set-point, the engine speed, the engine load, and the pre-catalyst emission level. In a non-limiting example, in the combustion engine look-up table, different values of the pre-catalyst emission level may be stored with respect to corresponding values of the EGR set-point, the engine speed, and the engine load.

Accordingly, in some embodiments of the invention, in order to determine the pre-catalyst emission level, the processor 110 may determine one or more of the engine speed (rpm), the engine load (kW), the BMEP (psi or bar), and an actual value of the EGR set-point (described later). The processor 110 may then use the combustion engine model (for example, the equations 2-4 or the combustion engine look-up table) to determine the pre-catalyst emission level corresponding to the determined engine speed (rpm), engine load (kW), BMEP (psi or bar), and actual value of the EGR set-point. In some embodiments of the invention, the processor 110 may store the pre-catalyst emission level determined at step 202 in the memory 112.

Further, in some embodiments of the invention, as shown in FIG. 2, the method 200 includes determining a post-catalyst emission level using a three-way catalyst model based on the pre-catalyst emission level, at step 204. For example, the post-catalyst emission level corresponding to one or more of the CO, NOx, or HC amount may be determined by the processor 110 using the three-way catalyst model.

In some embodiments of the invention, the three-way catalyst model may be indicative of properties of the three-way catalyst 106. For example, the three-way catalyst model may be a physics based model of the three-way catalyst 106. In a non-limiting example, the three-way catalyst model may be represented by following equations:

$$\varepsilon \frac{\partial c_{g,i}}{\partial t} = -u\varepsilon \frac{\partial c_{g,i}}{\partial x} - A_g \beta_i (c_{g,i} - c_{s,i}) \quad (5)$$

$$(1-\varepsilon) \frac{\partial c_{s,i}}{\partial t} = A_g \beta_i (c_{g,i} - c_{s,i}) + \sum_{j=1}^{N} r_{i,j} \quad (6)$$

$$r = k_i \prod_{i=1}^{N} c_i, \ k_i = A_i e^{-\frac{E_i}{RT}} \quad (7)$$

wherein, $\varepsilon$ represents open frontal area or void fraction of the three-way catalyst 106, $c_g$ represents gas phase concentration of contaminants (for example, NOx, CO, or HC) in the pre-catalyst exhaust gas stream 22, $c_s$ represents surface phase concentration of the contaminants in the pre-catalyst exhaust gas stream 22, u represents a measured exhaust gas stream mass flow-rate, $A_g$ represents geometric surface area of the three-way catalyst 106, $\beta$ represents mass transfer coefficient from gas phase to surface phase and vice-versa, $r_{i,j}$ represents rate of reaction of $i^{th}$ contaminant participating in $j^{th}$ reaction, $k_i$ represents reaction rate constant, $A_i$ represents pre exponential factor, $E_i$ represents activation energy, T represents a measured exhaust gas stream temperature, and R represents universal gas constant.

In some alternative embodiments of the invention, the three-way catalyst model may further be simplified using conservation of contaminants feature. The simplified three-way catalyst model may be represented using a single equation of gas phase contaminant concentrations. In a non-limiting example, the simplified three-way catalyst model may be represented by a following equation:

$$\frac{\partial c_{g,i}}{\partial t} = -u \frac{\partial c_{g,i}}{\partial x} + \frac{1}{\varepsilon} \sum_{j=1}^{N} r_{i,j} \quad (8)$$

In one embodiment of the invention, an input to the three-way catalyst model may include the pre-catalyst emission level determined at step 202. In some embodiments of the invention, in addition to the pre-catalyst emission level, the input value to the three-way catalyst model may further include the measured exhaust gas stream temperature, the measured exhaust gas stream mass flow-rate, or a combination thereof. Therefore, in order to determine the post-catalyst emission level, the processor 110 may also determine the measured exhaust gas stream temperature and the measured exhaust gas stream mass flow-rate.

Accordingly, in some embodiments of the invention, the power generation system 100 may further include a flow-rate sensor 118 and a temperature sensor 120. The flow-rate sensor 118 and the temperature sensor 120 may be disposed downstream of the three-way catalyst 106. The flow-rate sensor 118 and the temperature sensor 120 may generate electric signals indicative of levels of an exhaust gas stream mass flow-rate and an exhaust gas stream temperature, respectively, of the gas stream 10. The processor 110 may receive the electric signals generated by the flow-rate sensor 118 and the temperature sensor 120. These electric signals may aid in determining, by the processor 110, the levels of the exhaust gas stream mass flow-rate and the exhaust gas stream temperature, respectively. The levels of the exhaust gas stream mass flow-rate and the exhaust gas stream temperature, thus determined, are referred to as the "measured exhaust gas stream mass flow-rate," and the "measured exhaust stream gas temperature," respectively.

The processor 110 may then use the three-way catalyst model (for example, the equations 5-7 or the equation 8) to determine the post-catalyst emission level based on one or more of the pre-catalyst emission level determined at step 202, the measured exhaust gas stream mass flow-rate, and the measured exhaust stream gas temperature. In some embodiments of the invention, the processor 110 may store the post-catalyst emission level determined at step 204 in the memory 112.

In some embodiments of the invention, the method 200 further includes determining an adjusted post-catalyst emission level, at step 206. In a non-limiting example, the processor-executable routines executed by the processor 110 to determine the adjusted post-catalyst emission level may constitute a functionality of an estimator, such as, a Kalman filter or an extended Kalman filter. In one embodiment of the invention, the Kalman filter or the extended Kalman filter may have been configured to incorporate therein a behavior of the power generation system 100. Accordingly, the post-catalyst emission level determined by the processor 110, at step 204, may further be corrected to determine the adjusted post-catalyst level using the estimator. Accordingly, in some embodiments of the invention, the adjusted post-catalyst emission level may be representative of an error corrected form of the post-catalyst emission level, determined at step 204.

In some embodiments of the invention, additional inputs to the processor 110 for determining the adjusted post-catalyst emission level may further include one or more of a measured pre-catalyst emission level, a measured post-catalyst emission level, a measured humidity content in the gas stream 10, at least one fuel quality parameter, or combinations thereof.

In some embodiments of the invention, in order to determine the measured pre-catalyst emission level, the power generation system 100 may include a pre-catalyst emission sensor 115. The pre-catalyst emission sensor 115 may be disposed upstream of the three-way catalyst 106. In a non-limiting example, the pre-catalyst emission sensor 115 may be disposed at any suitable location in a flow path of the pre-catalyst exhaust gas stream 22, the exhaust gas stream 20, or the EGR stream 24. The pre-catalyst emission sensor 115 may generate an electrical signal indicative of a level of a given contaminant (for example, NOx) in the flow path prior to the three-way catalyst 106. The electrical signal generated by the pre-catalyst emission sensor 115 may aid in determining, by the processor 110, the level of any of the contaminants (for example, NOx) in the exhaust gas stream 20, the pre-catalyst exhaust gas stream 22, or the EGR stream 24. Hereinafter, the level of the given contaminant that is determined based on the electrical signal generated by the pre-catalyst emission sensor 115 may be referred to as the "measured pre-catalyst emission level." In some embodiments of the invention, the processor 110 may store the measured pre-catalyst emission level in the memory 112.

Further, in some embodiments of the invention, in order to determine the measured post-catalyst emission level, the power generation system 100 may include a post-catalyst emission sensor 122 disposed downstream of the three-way catalyst 106. In a non-limiting example, the post-catalyst emission sensor 122 may be disposed at any suitable location in a flow path of the gas stream 10. The post-catalyst emission sensor 122 may generate another electrical signal that is indicative of a level of a given contaminant (for example, NOx) in the flow path downstream of the three-way catalyst 106. The electrical signal generated by the post-catalyst emission sensor 122 may aid in determining, by the processor 110, the level of any of the contaminants (for example, NOx) in the gas stream 10. Hereinafter, the level of the given contaminant that is determined based on the electrical signal generated by the post-catalyst emission sensor 122 may be referred to as the "measured post-catalyst emission level." In some embodiments of the invention, the processor 110 may store the measured post-catalyst emission level in the memory 112.

In some embodiments of the invention, in order to determine the measured humidity content in the gas stream 10, the power generation system 100 may include a humidity sensor 124 disposed downstream of the three-way catalyst 106. The humidity sensor 124 may generate another electrical signal that is indicative of the humidity content in the gas stream 10. The electrical signal generated by the humidity sensor 124 may aid in determining, by the processor 110, the level of the exhaust gas stream humidity content. The level of the exhaust gas stream humidity content determined based on the electrical signal generated by the humidity sensor 124 may is referred to as the "measured exhaust gas stream humidity content". In some embodiments of the invention, the processor 110 may store the measured exhaust gas stream humidity content in the memory 112.

Additionally, in some embodiments of the invention, the power generation system 100 may further include one or more sensors (not shown) capable of measuring the fuel quality parameter. In a non-limiting example, the term "fuel quality parameter" may be indicative of one or more of a fuel energy density, a fuel propensity for knock (for example, a methane number), fuel contaminants (for example, sulfur and fluorides), a contaminant particle size, or combinations thereof. In some embodiments of the invention, an information corresponding to one or more of the fuel energy density, the fuel propensity for knock, the fuel contaminants, the contaminant particle size, and combinations thereof, may be known for a given fuel and stored in the memory 112.

Once one or more of the post-catalyst emission level, the measured pre-catalyst emission level, the measured post-catalyst emission level, the measured humidity content in the gas stream 10, and at least one fuel quality parameter are determined, the processor 110 may determine the adjusted post catalyst emission level, for example, using the Kalman filter or the extended Kalman filter.

In some embodiments of the invention, the method 200 further includes determining a difference between the post-catalyst emission level and the adjusted post-catalyst emission level, at step 208. The difference may be determined by the processor 110 by subtracting the post-catalyst emission level from the adjusted post-catalyst emission level, or vice versa. In some embodiments of the invention, the difference may be an absolute difference.

Furthermore, in some embodiments of the invention, the method 200 further includes performing a check to determine if the difference is greater than a threshold value, at step 210. The processor 110 may perform the check at the step 210. For example, the threshold value may be indicative of an allowable deviation between the post-catalyst emission level and the adjusted post-catalyst emission level and is stored in the memory 112. In some embodiments of the invention, the threshold value may be predefined, for example, by an operator, technician, or manufacturer of the power generation system 100 or the engine controller 104. Performing the check at step 210 may include comparing the difference with the threshold value. If the difference is smaller than the threshold value, the processor 110 may determine that the power generation system 100 is operating normally and the emission amount in the gas stream 10 is under control. Accordingly, as shown in FIG. 2, the method 200 may include circling back to step 202 if the difference is smaller than the threshold value. However, if the difference is greater than the threshold value, the processor 110 may determine that the emission amount in the gas stream 10 may need to be controlled, and the method 200 may further include preforming the step 212 (described later).

The method 200 further includes, in some embodiments of the invention, at step 214, determining an estimated value of an engine operating parameter. In one embodiment of the invention, the engine operating parameter includes the EGR set-point, the $\lambda$ set-point, an engine ignition timing, or combinations thereof. The estimated value of the engine operating parameter may be determined by the processor 110 based on the adjusted post-catalyst emission level, the emission regulation data, an EGR curve, a $\lambda$ curve, or combinations thereof, stored in the memory 112, in some embodiments. In some embodiments of the invention, the estimated value of the engine operating parameter may be determined further based on a combustion engine age, a three-way catalyst age, or a combination thereof. The combustion engine age and the three-way catalyst age may be determined by the processor 110 and stored in the memory 112, in some embodiments.

Figure 3:
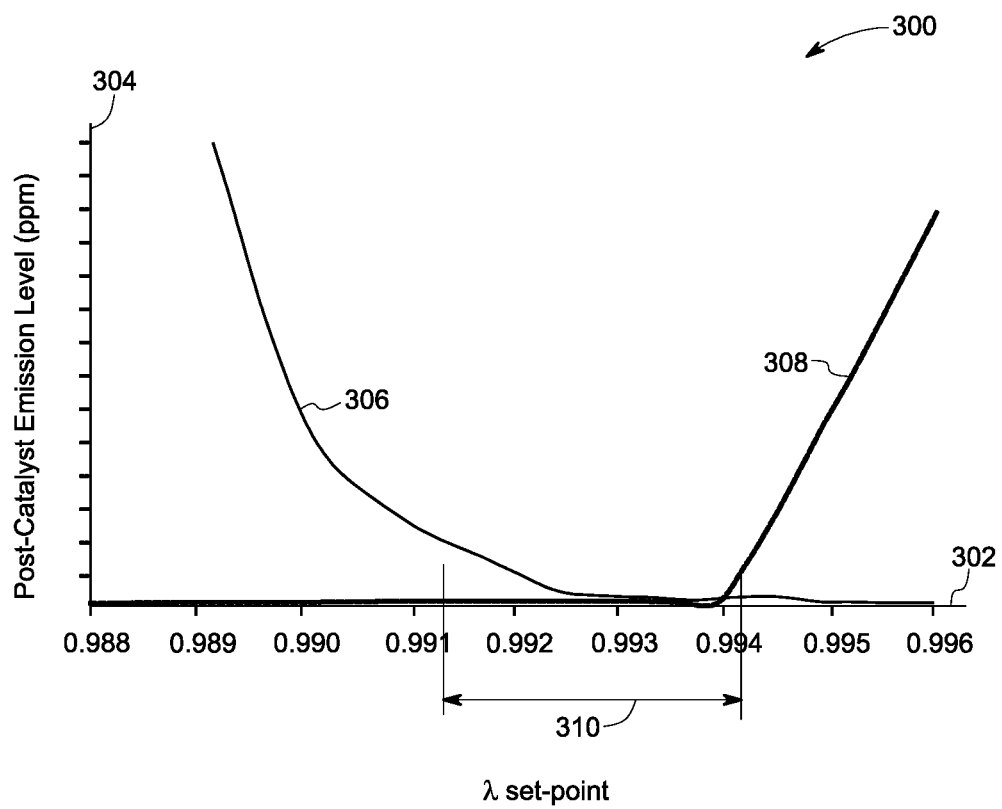
FIG. 3 is a graphical representation depicting a lambda curve, in accordance with one embodiment of the invention.

The $\lambda$ curve data, that is used to determine the estimated value of the engine operating parameter, may be obtained from a $\lambda$ curve. The $\lambda$ curve may be a relationship between an adjusted post-catalyst emission level (described later) and the $\lambda$ set-point. In one embodiment of the invention, the information of the $\lambda$ curve may be stored as the $\lambda$ curve data in the form of a look-up table or a mathematical relationship. In a non-limiting example, the $\lambda$ curve data may include information from a $\lambda$ curve of FIG. 3. FIG. 3 is a graphical representation depicting a $\lambda$ curve 300, in accordance with one embodiment of the invention. As illustrated in FIG. 3, in some embodiments of the invention, the $\lambda$ curve 300 may be indicative of a relationship between the adjusted post-catalyst emission level and the $\lambda$ set-point.

The X-axis of the $\lambda$ curve 300 is represented by a reference numeral 302 and the Y-axis of the $\lambda$ curve 300 is represented by a reference numeral 304. The X-axis 302 represents values of $\lambda$ set-points. The Y-axis 304 represents the adjusted post-catalyst emission level corresponding to the contaminants, such as, NOx and CO, for example. A curve 306 may represent the adjusted post catalyst emission levels of CO corresponding to different values of the $\lambda$ set-points. Similarly, a curve 308 may represent the adjusted post catalyst emission levels of NOx corresponding to different values of the $\lambda$ set-points. Although not shown, the $\lambda$ curve 300 of FIG. 3 may also include a curve indicative of the adjusted post catalyst emission levels of HC corresponding to different values of the $\lambda$ set-points.

In certain embodiments of the invention, determining the estimated value of the engine operating parameter may include determining, by the processor 110, a range of estimated values of the engine operating parameter based on the adjusted post-catalyst emission level, the emission regulatory limit, and one or both of the $\lambda$ curve data and the EGR curve data. In a non-limiting example, a $\lambda$ set-point range 310 may be representative of one such range of estimated values of $\lambda$ set-point such that the emission amount in the gas stream 10 is maintained below the emission regulatory limit. Further, the estimated value of the engine operating parameter, for example, $\lambda$ set-point, may be selected from the range of estimated values of the engine operating parameter.

Figure 4:
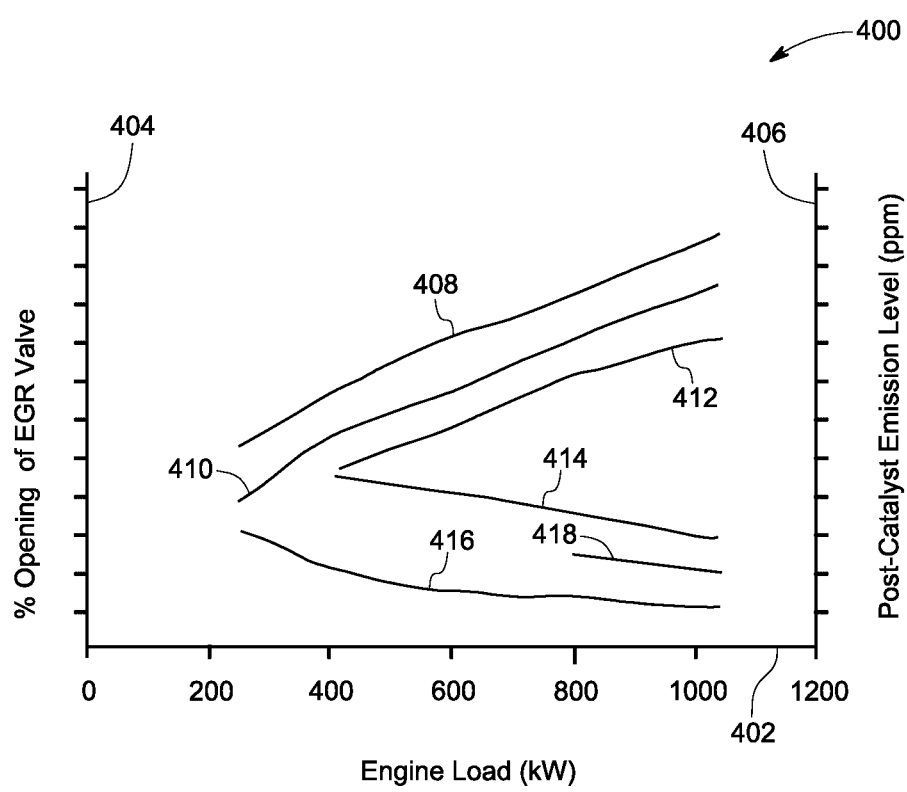
FIG. 4 is a graphical representation depicting an exhaust gas recirculation (EGR) curve, in accordance with one embodiment of the invention.

The EGR curve may be a relationship between at least two of the EGR set-point, the engine load, and the pre-catalyst emission level. In one embodiment of the invention, the information of the EGR curve may be stored as EGR curve data in the form of a look-up table or a mathematical relationship. In a non-limited example, the EGR curve data may include information from an EGR curve of FIG. 4. FIG. 4 is a graphical representation depicting an EGR curve 400, in accordance with one embodiment of the invention. As illustrated in FIG. 4, in some embodiments of the invention, the EGR curve 400 may be indicative of a relationship between at least two of the EGR set-point, the engine load, and the pre-catalyst emission level.

The X-axis of the EGR curve 400 is represented by a reference numeral 402. A first Y-axis of the EGR curve 400 is represented by a reference numeral 404 and a second Y-axis of the EGR curve 400 is represented by a reference numeral 406. The X-axis 402 represents the engine load in kilowatts (kW), for example. The first Y-axis represents 404 the EGR set-points (for example, EGR valve open position) in percentage, for example. Further, in one embodiment of the invention, the second Y-axis 406 may represent the pre-catalyst emission level corresponding to the contaminant, such as, NOx. In another embodiment of the invention, the second Y-axis 406 may represent the pre-catalyst emission level corresponding to CO or HC.

In one embodiment of the invention, curves 408, 410, and 412 may represent maximum values of the EGR set-point, estimated values of the EGR set-point, and minimum values of the EGR set-point, respectively. Further, curves 414 and 416 may represent values of the pre-catalyst emission level corresponding to the values of the EGR set-point indicated by curves 408 and 410, respectively.

In some embodiments of the invention, the method 200 may further include, at step 216, adjusting an actual value of the engine operating parameter based on the estimated value of the engine operating parameter. The actual value of the engine operating parameter may be adjusted such that the emission amount in the gas stream 10 is maintained below an emission regulatory limit, in some embodiments.

The emission regulatory limit may refer to allowable level of a given contaminant in accordance with relevant emission regulation norms. In a non-limiting example, the emission regulation norms may be governed by United States Environmental Protection Agency (EPA), Bharat Stage (BS) emission standards, or European emission standards.

In one embodiment of the invention, the actual value of the engine operating parameter may be adjusted by the processor 110 by communicating one or more signals to respective system elements of the power generation system 100. In a non-limiting example, in order to adjust an actual value of the $\lambda$ set-point, the processor 110 may communicate a first control signal to a fuel control valve 114. In one embodiment of the invention, the fuel control valve 114 may be fluidly coupled to a fuel source (not shown) to receive a fuel 14. The fuel control valve 114 may further be fluidly coupled to the intake conduit 104 to supply the fuel stream 16 thereto. The fuel control valve 114 may control the flow of the fuel stream 16 to the intake conduit 104. The first control signal may be indicative of a required open position of the fuel control valve 114. Accordingly, the fuel control valve 114 may be operated at the required open position such that the actual value of the λ set-point may be equivalent to an estimated value of the λ set-point.

Further, in another non-limiting example, in order to adjust an actual value of the EGR set-point, the processor 110 may communicate a second control signal to the EGR valve 116. The second control signal may be indicative of a required open position of the EGR valve 116. Accordingly, the EGR valve 116 may be operated at the required open position such that the actual value of the EGR set-point may be equivalent to an estimated value of the EGR set-point.

Furthermore, in yet another non-limiting example, in order to adjust an actual value of the engine ignition timing, the processor 110 may communicate a third control signal to the fuel injector (not shown), the intake valve (not shown), or a combination thereof, of the combustion engine 102. The third control signal may be indicative of a desired piston position from a top dead center (TDC) at which the mixed stream 18 needs to be injected. Accordingly, the mixed stream 18 may be injected into the combustion engine 102 at the desired piston position such that the actual value of the engine ignition timing may be equivalent to an estimated value of the engine ignition timing.

It is to be noted that, in one embodiment of the invention, the emission amount in the gas stream 10 may be maintained below the emission regulatory limit by adjusting one of the EGR set-point, the λ set-point, or the engine ignition timing. In another embodiment of the invention, two or more of the EGR set-point, the λ set-point, or the engine ignition timing may be controlled simultaneously to maintain the emission amount in the gas stream 10 below the emission regulatory limit. Advantageously, a method and system that have the capability of adjusting two or more of the EGR set-point, the λ set-point, or the engine ignition timing may facilitate increased degree of freedom while achieving reduced emission amount in the exhaust gas.

Referring again to FIG. 4, in some embodiments of the invention, a misfire condition may occur during the operation of the power generation system 100 for values of EGR set-points greater than the maximum values indicated by the curve 408 for a given engine load. The term "misfire condition" as used herein may refer to an instance of one or more processes of a combustion cycle, in the combustion engine 102, being skipped. Moreover, the misfire condition and/or a knock condition may occur during the operation of the power generation system 100 for values of EGR set-points lower than the minimum values indicated by the curve 412, for a given engine load. The term "knock condition" as used herein may refer to an instance of the combustion engine 102 generating pinging sounds due to abnormal combustion inside the combustion chamber of the combustion engine 102.

Referring again to FIG. 2, in some embodiments of the invention, the method 200, at step 216 may optionally adjust the actual value of the engine operating parameter based on the estimated value of the engine operating parameter such that a number of occurrences of the misfire condition is maintained below a determined number of misfire occurrences. For example, the determined number of misfire occurrences may be indicative of allowable misfire occurrences and is stored in the memory 112. In some embodiments of the invention, the number of allowable misfire occurrences may be predefined, for example, by an operator, technician, or manufacturer of the power generation system 100 or the engine controller 104. In some embodiments of the invention, the number of allowable misfire occurrences may be determined by the processor 110.

Alternatively, or, in addition, in some embodiments of the invention, the method 200, at step 216 may optionally adjust the actual value of the engine operating parameter based on the estimated value of the engine operating parameter such that a number of occurrences of the knock condition is maintained below a determined number of knock occurrences. For example, the determined number of knock occurrences may be indicative of allowable knock occurrences and is stored in the memory 112. In some embodiments of the invention, the number of allowable knock occurrences may be predefined, for example, by an operator, technician, or manufacturer of the power generation system 100 or the engine controller 104. In some embodiments of the invention, the number of allowable knock occurrences may be determined by the processor 110.

In a non-limiting example, in order to maintain the pre-catalyst emission level of NOx, as indicated by curve 418, between the engine loads ranging from 800 kW to 1050 kW, the processor 110 may determine estimated value of EGR set-point that confirms the values indicated by the curve 410, thereby avoiding the misfire and knock conditions.

In some embodiments of the invention, the method may optionally include, at step 212, determining an emission regulatory limit. In some embodiments of the invention, the processor 110 may determine the emission regulatory limit using an emission regulation data stored in the memory 112. In some embodiments of the invention, the emission regulation data may be stored in the memory 112 in the form of a look-up table, hereinafter referred to as, an emission data look-up table. The emission data look-up table may include information including, but not limited to, a list of one or more regions and at least a set of location coordinates corresponding to the one or more regions. For example, a set of location coordinates may define a region of the one or more regions. Further, the emission data look-up table may also include an emission regulatory limit of the post-catalyst emission level corresponding one or more contaminants for the one or more regions. The term "region" as used herein may refer to a region of operation of the power generation system 100, where the term region may correspond to any of a jurisdiction, a country, and a state. Further details for the steps of determining the emission regulatory limit are described later in conjunction with FIG. 5.

Referring again to FIG. 1, as will be appreciated, in some embodiments of the invention, the power generation system 100 may also be employed in mobile applications, where a vehicle employing the power generation system 100 may stay in or transit through multiple regions. Moreover, different regions may also have different emission regulatory limits for a given contaminant. Accordingly, it may be advantageous to control the emission amount in the gas stream 10 based on the location-specific emission regulatory limit.

Accordingly, in some embodiments of the invention, the power generation system 100 may also include a global positioning system (GPS) sensor 126. The GPS sensor 126 may be communicatively coupled to the engine controller 108. More particularly, the GPS sensor 126 may be communicatively coupled to the engine controller 108. The GPS sensor 126 may determine location coordinates of the power generation system 100. In one embodiment of the invention, the GPS sensor 126 may determine the location coordinates of the power generation system 100 at a regular interval of time. In another embodiment of the invention, the GPS sensor 126 may determine the location coordinates of the power generation system 100 at random or irregular intervals of time. In yet another embodiment of the invention, the GPS sensor 126 may determine the location coordinates of the power generation system 100 on a request from the processor 110.

In one embodiment of the invention, once the location coordinates of the power generation system 100 are determined, the location coordinates may be communicated by the GPS sensor 126 to the processor 110. The processor 110 may then store the received location coordinates into the memory 112. In another embodiment of the invention, once the location coordinates of the power generation system 100 is determined, the location coordinates may be stored in the memory 112 by the GPS sensor 126.

Figure 5:
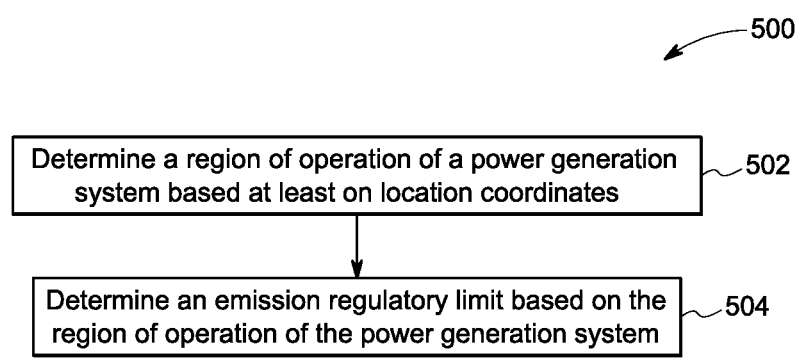
FIG. 5 depicts a flowchart illustrating a method for determining an emission regulatory limit, in accordance with one embodiment of the invention.

In some embodiments of the invention, the processor 110 may utilize the location coordinates determined by the GPS sensor 126 to determine the emission regulatory limit at step 212 of the method 200. FIG. 5 illustrates the details of the step 212 of FIG. 2. More particularly, FIG. 5 depicts a flowchart illustrating a method 500 for determining the emission regulatory limit, in accordance with one embodiment of the invention. As illustrated in FIG. 5, in some embodiments of the invention, the method 500 may include steps 502 and 504. Steps 502 and 504 may be performed by the processor 110 when one or more of the processor-executable routines are executed by the processor 110. In a non-limiting example, one or more of the steps 502 and 504 may contribute to one or more of the acts performed, when one or more of the processor-executable routines are executed by the processor 110.

In some embodiments of the invention, the method 500 includes, at step 502, determining a region of operation of the power generation system 100 based at least on the location coordinates determined by the GPS sensor 126. The processor 110 may reference the emission data look-up table to determine the region of operation. The processor 110 may determine the region of operation corresponding to the location coordinates from the emission data look-up table. For example, in order to determine the region of operation, the processor 110 may perform a check to determine whether the determined location coordinates belong to a certain set of location coordinates stored in the emission data look-up table. If a set of location coordinates that includes the determined location coordinates is identified, the processor 110 may select a region corresponding to the identified set of location coordinates from the emission data look-up table as the region of operation of the power generation system 100.

Further, in some embodiments of the invention, the method 500 includes, at step 504, determining an emission regulatory limit based on the region of operation of the power generation system 100. The processor 110 may reference the emission data look-up table to determine the emission regulatory limit. For example, for the determined region of operation, the processor 110 may select an emission regulation norm for the given contaminant from the emission data look-up table.

The systems and methods according to some embodiments of the invention aid in reducing the emission amount in the exhaust gas stream emitted from the power generation system 100 such that the emission amount is maintained below the emission regulatory limit. Accordingly, environmental hazards that may have caused due to such emissions is limited. As a result, the systems and methods described herein may help achieve a greener environment.

Moreover, in some embodiments of the invention, the systems and methods described herein may also aid in maintaining the operation of the power generation system 100 at substantially close to the stoichiometric condition by way of adjusting the actual value of the engine operating parameter while achieving reduced levels of contaminants in the exhaust gas stream. In addition, when the power generation system 100 may be used in the mobile application, the emission regulatory limit for a given region may be referenced by the processor 110 while determining the estimated value of the engine parameter. Accordingly, the emissions may be controlled such that the emission amount in the gas stream 10 may be maintained below the emission regulatory limit for an instantaneous region of operation of the power generation system 100.

The present invention has been described in terms of some specific embodiments of the invention. They are intended for illustration only, and should not be construed as being limiting in any way. Thus, it should be understood that modifications can be made thereto, which are within the scope of the invention and the appended claims.

It will be appreciated that variants of the above disclosed and other features and functions, or alternatives thereof, may be combined to create many other different systems or applications. Different implementations of the systems and methods may perform some or all of the steps described herein in different orders, parallel, or substantially concurrently. Various unanticipated alternatives, modifications, variations, or improvements therein may be subsequently made by those skilled in the art and are also intended to be encompassed by the following claims.

What is claimed is:

1. A method for controlling an emission amount in a gas stream emitted from a power generation system comprising a combustion engine operating at stoichiometric conditions and emitting an exhaust gas stream, an exhaust gas recirculation (EGR) system to recirculate a portion of the exhaust was stream to the combustion engine, a three-way catalyst disposed downstream of the combustion engine, one or more processors and a memory which is accessible to the processor, the method comprising:

determining a pre-catalyst emission level in at least one of the one or more processors by measuring at least an EGR set-point value with a pre-catalyst emission sensor disposed upstream of the three-way catalyst, at least one of the one or more processors receiving one or more signals generated by the pre-catalyst emission sensor and using a combustion engine model stored in the memory to correlate at least the EGR set-point value to the pre-catalyst emission level;

determining a post-catalyst emission level in at least one of the one or more processors using a three-way catalyst model stored in the memory to correlate catalyst properties based on the pre-catalyst emission level to the post-catalyst emission level;

determining an adjusted post-catalyst emission level in at least one of the one or more processors based on an error corrected form of the post-catalyst emission level;

determining a difference in at least one of the one or more processors between the post-catalyst emission level and the adjusted post-catalyst emission level and comparing the difference with a threshold value; and determining, in at least one of the one or more processors, whether the difference between the post-catalyst emission level and the adjusted post-catalyst emission level is greater than the threshold value and maintaining the emission amount in the gas stream below an emission regulatory limit by sending one or more signals from at least one of the one or more processors to adjust an actual value of an engine operating parameter when the difference between the post-catalyst emission level and the adjusted post-catalyst emission level is greater than the threshold value.

2. The method of claim 1, wherein the adjusted post-catalyst emission level is determined based on one or more measured parameters comprising a measured pre-catalyst emission level, a measured post-catalyst emission level, a gas stream humidity, or combinations thereof.

3. The method of claim 1, wherein the engine operating parameter comprises an exhaust gas recirculation (EGR) set-point, a lambda ($\lambda$) set-point, an engine ignition timing, or combinations thereof.

4. The method of claim 1, comprising determining that adjusting the actual operating parameter is required if the difference is greater than the threshold value, and further comprising sending a signal to adjust the engine operating parameter.

5. The method of claim 4, further comprising determining an estimated value of the engine operating parameter if the difference is greater than the threshold value and adjusting the actual value of the engine operating parameter based on the estimated value of the engine operating parameter.

6. The method of claim 5, comprising determining the estimated value of the engine operating parameter based on the adjusted post-catalyst emission level, the emission regulatory limit, and one or both of a $\lambda$ curve and an EGR curve.

7. The method of claim 6, wherein the $\lambda$ curve is indicative of a relationship between the adjusted post-catalyst emission level and a $\lambda$ set-point, and wherein the EGR curve is indicative of a relationship between at least two of an EGR set-point, an engine load, and the pre-catalyst emission level.

8. The method of claim 6, wherein the estimated value of the engine operating parameter is determined further based on a combustion engine age, a three-way catalyst age, or a combination thereof.

9. The method of claim 6, wherein determining the estimated value of the engine operating parameter comprises:
  determining a range of estimated values of the engine operating parameter based on the adjusted post-catalyst emission level, the emission regulatory limit, and one or both of the $\lambda$ curve and the EGR curve; and
  selecting the estimated value of the engine operating parameter from the range of estimated values of the engine operating parameter.

10. The method of claim 5, further comprising adjusting the actual value of the engine operating parameter based on the estimated value of the engine operating parameter such that a number of occurrences of a misfire condition is maintained below a determined number of misfire occurrences.

11. The method of claim 5, further comprising adjusting the actual value of the engine operating parameter based on the estimated value of the engine operating parameter such that a number of occurrences of a knock condition is maintained below a determined number of knock occurrences.

12. The method of claim 1, further comprising:
  determining a region of operation of the power generation system based at least on location coordinates determined via a global positioning system sensor; and
  determining the emission regulatory limit based on the region of operation of the power generation system.

13. The method of claim 1, wherein an input value to the three-way catalyst model further comprises a gas stream temperature, a gas stream mass flow-rate, or a combination thereof.

14. An engine controller for controlling an emission amount in a gas stream emitted from a power generation system comprising a combustion engine operating at stoichiometric conditions and emitting an exhaust gas stream, an exhaust gas recirculation (EGR) system to recirculate a portion of the exhaust gas stream to the combustion engine, and a three-way catalyst disposed downstream of the combustion engine, the engine controller comprising:
  a memory storing one or more processor-executable routines; and
  one or more processors to execute the one or more processor-executable routines which, when executed, cause acts to be performed comprising:
    determining a pre-catalyst emission level in at least one of the one or more processors by measuring at least an EGR set-point value with a pre-catalyst emission sensor disposed upstream of the three-way catalyst, at least one of the one or more processors receiving one or more signals generated by the pre-catalyst emission sensor and using a combustion engine model stored in the memory to correlate at least the EGR set-point value to the pre-catalyst emission level;
    determining a post-catalyst emission level in at least one of the one or more processors using a three-way catalyst model stored in the memory to correlate catalyst properties based on the pre-catalyst emission level to the post-catalyst emission level;
    determining an adjusted post-catalyst emission level in at least one of the one or more processors based on an error corrected form of the post-catalyst emission level;
    determining a difference in at least one of the one or more processors between the post-catalyst emission level and the adjusted post-catalyst emission level and comparing the difference with a threshold value; and
    determining, in at least one of the one or more processors, whether the difference between the post-catalyst emission level and the adjusted post-catalyst emission level is greater than the threshold value and maintaining the emission amount in the gas stream below an emission regulatory limit by sending one or more signals from at least one of the one or more processors to adjust an actual value of an engine operating parameter when the difference between the post-catalyst emission level and the adjusted post-catalyst emission level is greater than the threshold value.

15. The engine controller of claim 14, wherein the engine operating parameter comprises an exhaust gas recirculation (EGR) set-point, a lambda ($\lambda$) set-point, an engine ignition timing, or combinations thereof.

16. The engine controller of claim 14, wherein the acts to be performed further comprise determining an estimated value of the engine operating parameter if the difference is greater than the threshold value and adjusting the actual value of the engine operating parameter based on the estimated value of the engine operating parameter.

17. A power generation system, comprising:
  a combustion engine operating at stoichiometric conditions and emitting an exhaust gas stream;

an exhaust gas recirculation (EGR) system to recirculate a portion of the exhaust gas stream to the combustion engine;

a three-way catalyst disposed downstream of the combustion engine; and an engine controller operably coupled to the combustion engine to control an emission amount in a gas stream emitted from the power generation system, wherein the engine controller comprises:

a memory storing one or more processor-executable routines; and one or more processors to execute the one or more processor-executable routines which, when executed, cause acts to be performed comprising:

determining a pre-catalyst emission level in at least one of the one or more processors by measuring at least an EGR set-point value with a pre-catalyst emission sensor disposed upstream of the three-way catalyst, at least one of the one or more processors receiving one or more signals generated by the pre-catalyst emission sensor and using a combustion engine model stored in the memory to correlate at least the EGR set-point value to the pre-catalyst emission level;

determining a post-catalyst emission level in at least one of the one or more processors using a three-way catalyst model stored in the memory to correlate catalyst properties based on the pre-catalyst emission level to the post-catalyst emission level;

determining an adjusted post-catalyst emission level in at least one of the one or more processors based on an error corrected form of the post-catalyst emission level;

determining a difference in at least one of the one or more processors between the post-catalyst emission level and the adjusted post-catalyst emission level and comparing the difference with a threshold value; and determining, in at least one of the one or more processors, whether the difference between the post-catalyst emission level and the adjusted post-catalyst emission level is greater than the threshold value and maintaining the emission amount in the gas stream below an emission regulatory limit by sending one or more signals from at least one of the one or more processors to adjust an actual value of an engine operating parameter when the difference between the post-catalyst emission level and the adjusted post-catalyst emission level is greater than the threshold value.

18. The power generation system of claim 17, wherein the engine operating parameter comprises an exhaust gas recirculation (EGR) set-point, a lambda (λ) set-point, an engine ignition timing, or combinations thereof.

19. The power generation system of claim 17, wherein the acts to be performed further comprise determining an estimated value of the engine operating parameter if the difference is greater than the threshold value and adjusting the actual value of the engine operating parameter based on the estimated value of the engine operating parameter.

* * * * *